(12) United States Patent
Chou et al.

(10) Patent No.: US 7,167,289 B2
(45) Date of Patent: Jan. 23, 2007

(54) FOCUSING MODULE

(75) Inventors: Ming-Der Chou, Taipei (TW);
 Chin-Hung Chou, Taipei County (TW);
 Hsin-Tang Chien, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 12 days.

(21) Appl. No.: 11/007,240

(22) Filed: Dec. 9, 2004

(65) Prior Publication Data

US 2006/0033973 A1 Feb. 16, 2006

(30) Foreign Application Priority Data

Aug. 13, 2004 (TW) ................. 93212975 U

(51) Int. Cl.
 *G02B 26/08* (2006.01)
(52) U.S. Cl. ...................................... 359/210
(58) Field of Classification Search ................ 359/210, 359/819, 820, 198, 203, 206
 See application file for complete search history.

(56) References Cited

U.S. PATENT DOCUMENTS

| | | | | |
|---|---|---|---|---|
| 5,210,648 A | * | 5/1993 | Bedzyk | 359/813 |
| 5,583,686 A | * | 12/1996 | Chen | 359/198 |
| 6,476,955 B1 | * | 11/2002 | Yoshida | 359/204 |

* cited by examiner

*Primary Examiner*—Euncha P. Cherry
(74) *Attorney, Agent, or Firm*—Rabin & Berdo, P.C.

(57) ABSTRACT

A focusing module for scanners includes a body which holds a lens and a transmission device on one side thereof to move the lens linearly and adjust a desired scanning focal length. Therefore the diaphragm may be enlarged to increase the scanning speed without reducing the depth of field and dropping Modulation Transfer Function, and to achieve a faster scanning speed and a desired scanning quality.

15 Claims, 3 Drawing Sheets

FOCUSING MODULE

FIELD OF THE INVENTION

The present invention relates to a focusing module and particularly to a focusing module for automatic focusing in scanners.

BACKGROUND OF THE INVENTION

Scanners can transform plane photos, pictures, graphics and the like to a digital format for displaying, editing, storing and outputting on computers. With advance of image technology, the scanner has become an indispensable device in computer systems used in homes and offices.

To accurately reproduce the pictures is one of the most important requirements of the scanner. As the scanning quality improves, the scanning resolution enhances, and scanning time also increases. This, to scan a great amount of documents taking a lot of time, becomes a problem to users.

In the past, the most effective approach to increase scanning speed is to increase the diaphragm of the lens, but the depth of field decreases when the diaphragm increases. The scanning position of the film scan in the scanning system and the Auto Document Feeder system will be different from the original correct scanning position, and the focal distance alters. This causes dropping of the Modulation Transfer Function (MTF), and affects the scanning quality.

Hence how to provide fast scanning speed without sacrificing the scanning quality has been a goal actively pursued in the industry.

SUMMARY OF THE INVENTION

In view of the aforesaid disadvantages occurred to the conventional techniques, the primary object of the present invention is to provide a focusing module that has a transmission device to move the position of the lens to adjust the scanning focal length so that the scanning speed may be increased through the diaphragm without resulting in dropping of MTF. Thus a desired balance may be achieved on the scanning speed and the scanning quality.

The focusing module of the invention is adopted for use on scanners that have a photosensitive element. The focusing module includes a body, a lens and a transmission device located on the body. The transmission device can move the lens linearly to adjust the relative distance between the lens and the photosensitive element, therefore adjust the focal length.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
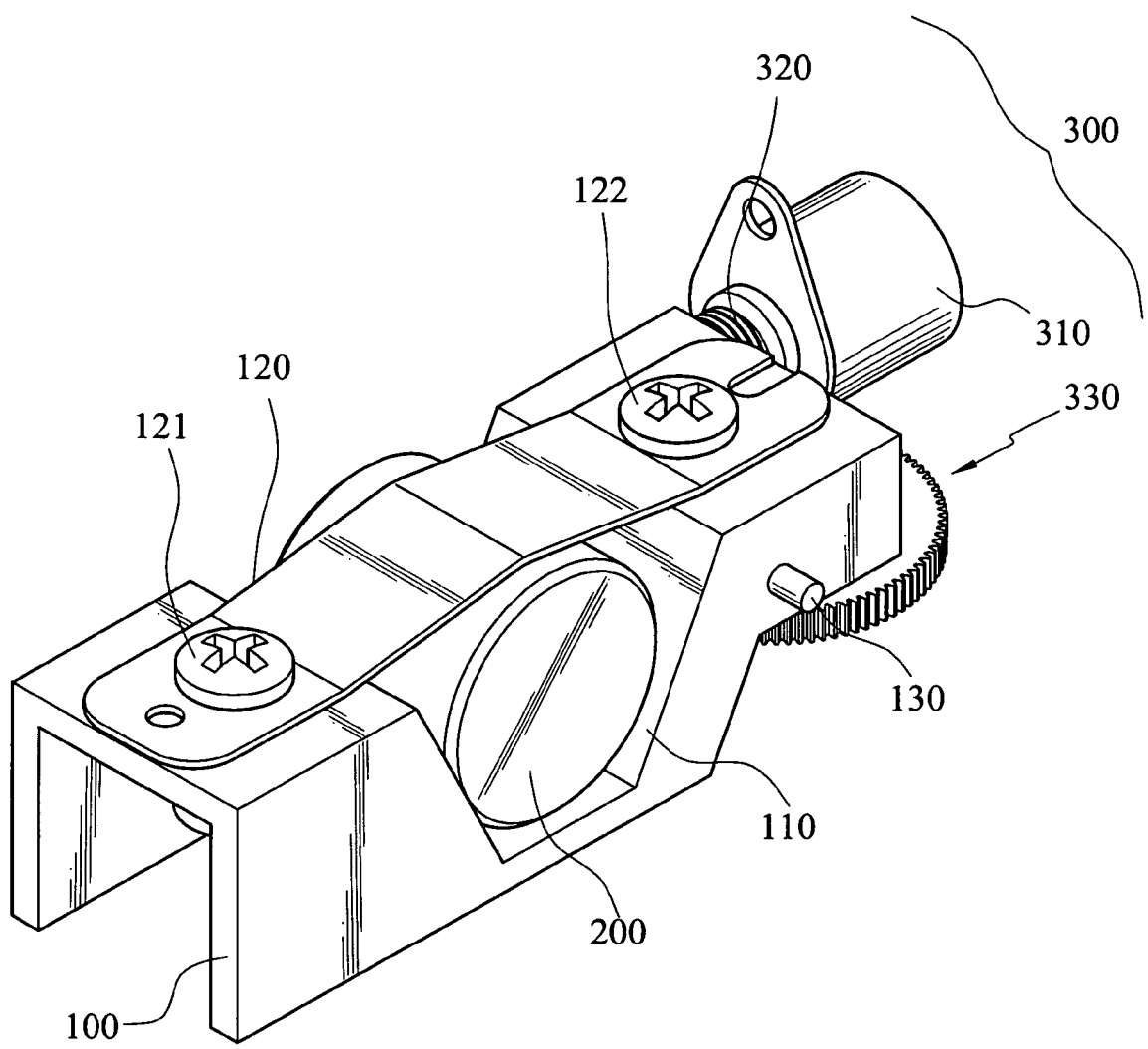
FIG. 1 is a perspective view of the focusing module of the invention.
Figure 2:
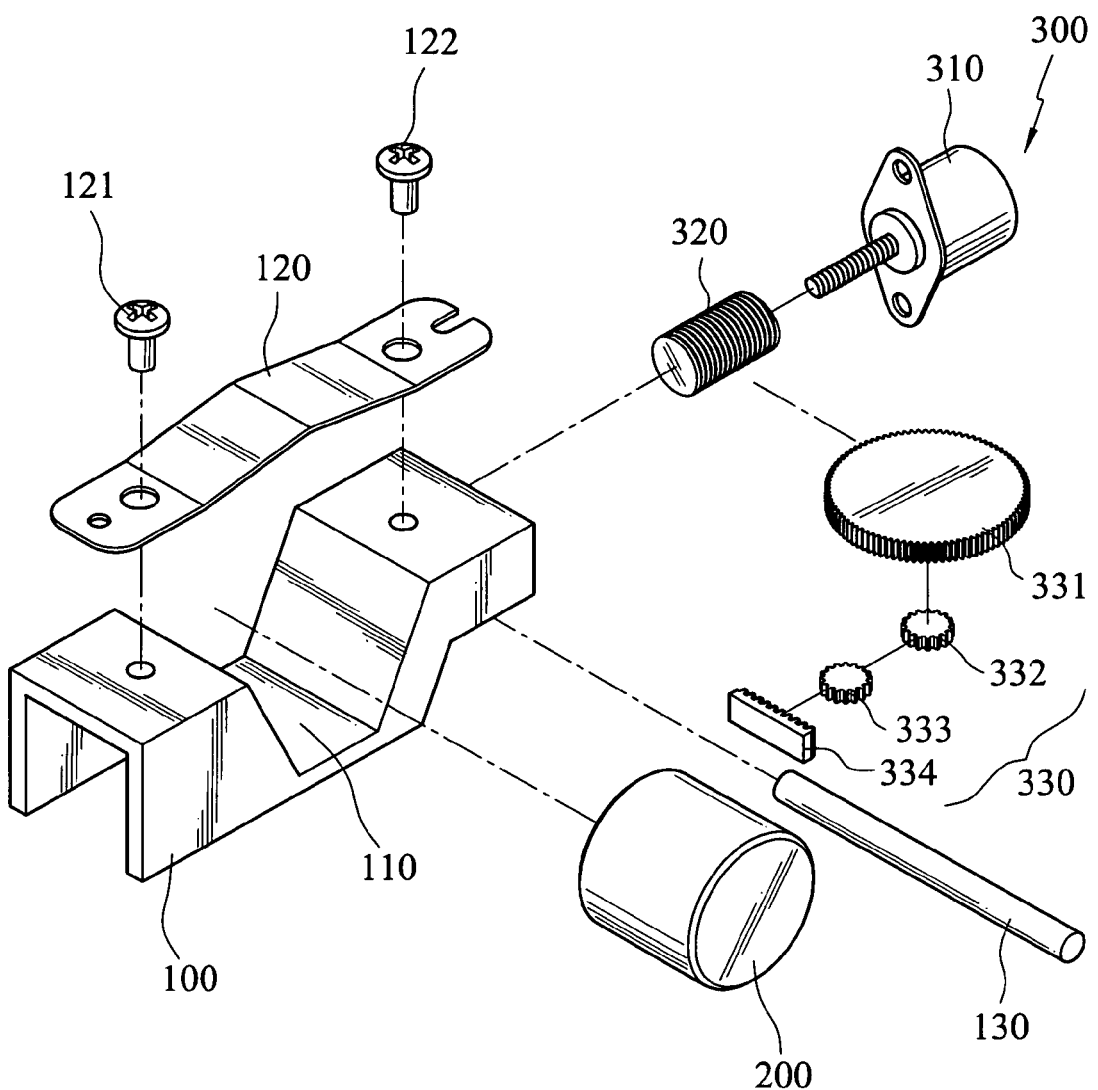
FIG. 2 is an exploded view of the focusing module of the invention.

Refer to FIGS. 1 and 2 for an embodiment of the focusing module of the invention. It mainly includes a body 100, a lens 200 and a transmission device 300.

The body 100 includes a holding trough 110, an anchor section 120 and an anchor shaft 130. The anchor section 120 is fastened to an outer side of the holding trough 110 through fastening elements 121 and 122. The fastening elements 121 and 122 are screws or the like. The lens 200 is held in the holding trough 110. As shown in the drawings, the anchor section 120 is a blade to hold the lens 200 in the holding trough 110. The anchor shaft 130 is located on one side of the body 100 to enable the body 100 to be movably mounted on a scanner.

The transmission device 300 is located on an outer side of the body 100 to move the body 100 linearly. In this embodiment, the transmission device 300 includes a motor 310, a screw row 320 and a gear set 330. The gear set 330 includes a first gear 331, a second gear 332, a third gear 333 and a gear rack 334 that engage with one another. The first gear 331 and the second gear 332 are coaxial. The second gear 332, third gear 333 and gear rack 334 are engaged with one another to form relative movements. The gear rack 334 is fixedly mounted onto the anchor shaft of the body 100. The motor 310 drives the screw row 320 to rotate that is engaged with the first gear 331 and also drives the first gear 331 to rotate.

Hence when the motor 310 drives the screw row 320 to rotate, the first gear 331, second gear 332 and third gear 333 of the gear set 330 also are driven to rotate, and the gear rack 334 on the anchor shaft 130 is moved so that the lens 200 on the body 100 is moved in the direction of the anchor shaft 130 to adjust the focal length.

In practice, the transmission device 300 may be constructed in many ways. Besides the gear set 330 and screw row 320 previously discussed, it also may include an eccentric wheel driven by a motor with the body in contact with the eccentric wheel. When the eccentric wheel is driven by the motor and rotates, it pushes the body to move linearly in the horizontal or longitudinal direction. In addition, a linear motor that can extend and retract, or a belt that can drag and move also may be used with equal effect.

Figure 3:
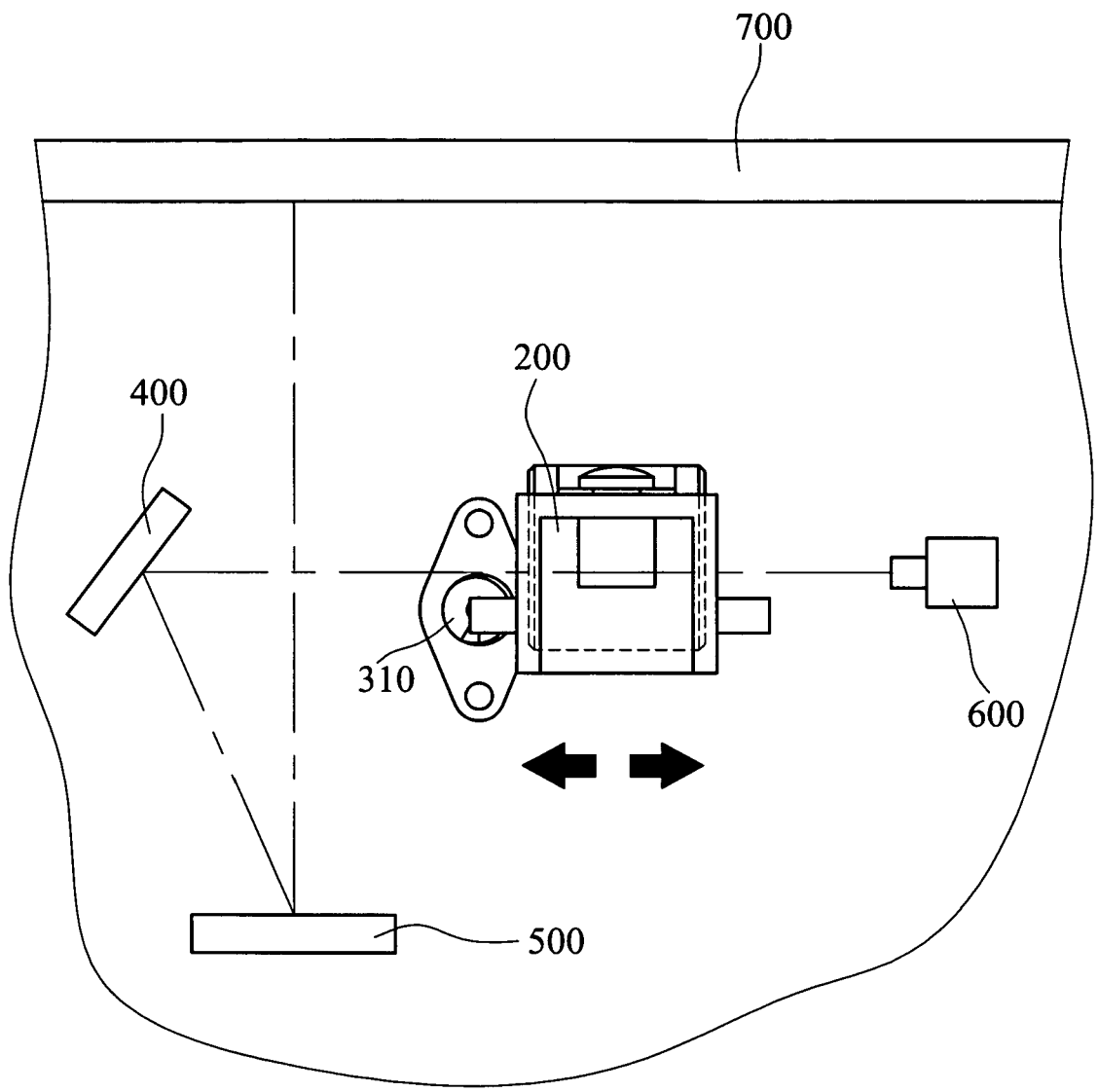
FIG. 3 is a schematic view of the focusing module of the invention in a use condition.

Refer to FIG. 3 for another embodiment of the invention that couples the lens 200 to generate a reflective focusing effect. It includes two reflecting mirrors 400 and 500 to receive light reflecting from object to be scanned, to reflect the light and then to focus on the lens 200.

Moreover, the invention further includes a photosensitive element 600 which may be a Charge-Coupled Device (CCD) or Complementary Metal-Oxide Semiconductor (CMOS) to receive the light reflected by the lens 200 and transform the light to analog signals.

During the scanning operation of a scanner 10, object to be scanned is placed on one side of a transparent plate 700 of the scanner 10. A light source is located on other side of the transparent plate 700. The light source emits light which passes through the transparent plate 700 and projects to object to be scanned to generate a reflective light. The reflective light passes through the transparent plate 700 and is reflected by the reflecting mirrors 400 and 500 to the lens 200 which focuses the light and projects to the photosensitive element 600. The photosensitive element 600 transforms the light to analog signals and outputs to a computer to form an image.

When the computer receives the analog signals resulting from scanning of the scanner, a selected image analysis software may be used to determine the scanning focal length and drive the motor 310 to move the position of the lens 200 and adjust the optimal focal length to achieve the optimal scanning result.

Therefore, through the focusing module of the invention, the focal length may be adjusted automatically. Namely, the diaphragm of the lens may be enlarged to increase the scanning speed without reducing the depth of field and dropping of MTF to achieve a desired scanning quality. The focusing module of the invention is simply structured, and may be fabricated easily and adopted to variety types of scanners.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A focusing module for a scanner, comprising:
   a body;
   a lens installed on the body;
   a transmission device coupled on the body to drive the lens to move linearly to adjust the relative distance between the lens and at least one photosensitive element which receives light reflected by the lens and transforms the light to analog signals; and
   image analysis software receiving the analog signals, determining the scanning focal length, adjusting the position of the lens, and adjusting the focal length to achieve the scanning result without dropping of Modulation Transfer Function (MTF).

2. A focusing module for a scanner, comprising:
   a body including an anchor shaft for mounting the body on the scanner;
   a lens installed on the body;
   a transmission device coupled on the body to drive the lens to move linearly to adjust the relative distance between the lens and at least one photosensitive element which receives light reflected by the lens and transforms the light to analog signals; and
   image analysis software receiving the analog signals, determining the scanning focal length, adjusting the position of the lens, and adjusting the focal length to achieve the scanning result without dropping of Modulation Transfer Function (MTF).

3. The focusing module of claim 1, wherein the body includes a holding trough for holding the lens.

4. A focusing module for a scanner, comprising:
   a body;
   a lens installed on the body;
   a transmission device coupled on the body to drive the lens to move linearly to adjust the relative distance between the lens and at least one photosensitive element which receives light reflected by the lens and transforms the light to analog signals; and
   image analysis software receiving the analog signals, determining the scanning focal length, adjusting the position of the lens, and adjusting the focal length to achieve the scanning result without dropping of Modulation Transfer Function (MTF);
   wherein the body includes a holding trough for holding the lens and an anchor section fixed on one side of the holding trough to confine the lens in the holding trough.

5. The focusing module of claim 4, wherein the anchor section is fastened to the one side of the holding trough through a plurality of fastening elements.

6. The focusing module of claim 5, wherein the fastening elements are screws.

7. The focusing module of claim 4, wherein the anchor section is a blade to confine the lens in the holding trough.

8. The focusing module of claim 1, wherein the transmission device includes a motor to provide driving power.

9. A focusing module for a scanner, comprising:
   a body;
   a lens installed on the body;
   a transmission device coupled on the body to drive the lens to move linearly to adjust the relative distance between the lens and at lest one photosensitive element which receives light reflected by the lens and transforms the light to analog signals; and
   image analysis software receiving the analog signals, determining the scanning focal length, adjusting the position of the lens, and adjusting the focal length to achieve the scanning result without dropping of Modulation Transfer Function (MTF);
   wherein the transmission device includes a motor to provide driving power, and the motor is a linear motor.

10. A focusing module for a scanner, comprising:
    a body;
    a lens installed on the body;
    a transmission device coupled on the body to drive the lens to move linearly to adjust the relative distance between the lens and at least one photosensitive element which receives light reflected by the lens and transforms the light to analog signals; and
    image analysis software receiving the analog signals, determining the scanning focal length, adjusting the position of the lens, and adjusting the focal length to achieve the scanning result without dropping of Modulation Transfer Function (MTF);
    wherein the transmission device includes a motor to provide driving power, a screw row and a gear set, the motor being coupled with the screw row, the gear set being installed on the body, the screw row being driven by the motor to drive the gear set.

11. The focusing module of claim 10, wherein the gear set includes at least a gear and a gear rack that are engaged with each other for moving together.

12. The focusing module of claim 11, wherein the gear and the motor are engaged with each other, the gear rack being fixedly mounted onto the body.

13. The focusing module of claim 12, wherein the body further includes an anchor shaft for holding the gear rack.

14. The focusing module of claim 8, wherein the transmission device further includes an eccentric wheel which is coupled with the motor and in contact with the body, the motor driving the eccentric wheel to rotate and move the body linearly to adjust the relative distance between the lens and the photosensitive element.

15. The focusing module of claim 8, wherein the transmission device further includes a belt which transmits the driving power of the motor to move the body linearly.

* * * * *